(12) United States Patent
Hoashi

(10) Patent No.: US 6,567,131 B1
(45) Date of Patent: May 20, 2003

(54) DECODING APPARATUS AND DECODING METHOD

(75) Inventor: Katsumi Hoashi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 439 days.

(21) Appl. No.: 09/670,808

(22) Filed: Sep. 28, 2000

(30) Foreign Application Priority Data

Sep. 29, 1999 (JP) ............................................ 11-276082

(51) Int. Cl.[7] .............................................. H04N 9/64
(52) U.S. Cl. ............... 348/714; 375/240.25; 375/240.02
(58) Field of Search ................................. 348/714, 718, 348/715; 375/240.25, 240.15, 240.11, 240.02, 240.26, 40.13; 382/233, 235; H04N 9/64

(56) References Cited

U.S. PATENT DOCUMENTS

| | | | | |
|---|---|---|---|---|
| 5,502,494 A | * | 3/1996 | Auld ..................... | 375/240.11 |
| 5,668,599 A | | 9/1997 | Cheney et al. | |
| 5,701,160 A | | 12/1997 | Kimura et al. | |
| 5,721,878 A | * | 2/1998 | Ottesen et al. ............... | 725/87 |
| 5,777,677 A | * | 7/1998 | Linzer et al. | |
| 5,818,512 A | * | 10/1998 | Fuller ......................... | 725/82 |
| 5,818,532 A | * | 10/1998 | Malladi et al. ......... | 375/240.03 |
| 5,818,539 A | * | 10/1998 | Naimpally et al. ......... | 348/512 |
| 5,887,111 A | | 3/1999 | Takahashi et al. | |
| 5,903,312 A | * | 5/1999 | Malladi et al. ......... | 375/240.03 |
| 5,973,740 A | * | 10/1999 | Hrusecky ................ | 375/240.15 |
| 6,118,823 A | * | 9/2000 | Carr ....................... | 375/240.28 |
| 6,125,147 A | * | 9/2000 | Florencio et al. ....... | 375/240.29 |
| 6,128,340 A | * | 10/2000 | Ozcelik et al. ......... | 375/240.15 |
| 6,356,317 B1 | * | 3/2002 | Watabe et al. .............. | 348/715 |

FOREIGN PATENT DOCUMENTS

| | | |
|---|---|---|
| DE | 19643376 | 3/1998 |
| EP | 0566092 | 10/1993 |
| EP | 0738084 | 10/1996 |
| EP | 0843485 | 5/1998 |
| GB | 2316824 | 4/1998 |
| JP | 7-170485 | 7/1995 |

OTHER PUBLICATIONS

European Search Report.

* cited by examiner

Primary Examiner—Michael H. Lee
(74) Attorney, Agent, or Firm—McDermott, Will & Emery

(57) ABSTRACT

Decoded data, which has been output from a decoder, is stored on storage so as to be presented or used for decoding another encoded data. A presentation method recognizer recognizes a presentation method for the decoded data. If the presentation method has been changed into a new presentation method, the recognizer sets the number of frame memories as required by the new presentation method. In that case, a memory allocator allocates the same number of sub-areas of the storage area as that set by the recognizer for the frame memories such that the sub-area previously allocated for the frame memory, on which the decoded data being presented is stored, is included in the sub-areas newly allocated.

9 Claims, 9 Drawing Sheets

DECODING APPARATUS AND DECODING METHOD

BACKGROUND OF THE INVENTION

The present invention relates generally to technology of decoding encoded data of a picture, and more particularly relates to an improved technique of controlling allocation of storage sub-areas for frame memories, on which decoded data is stored.

The MPEG standards have been known as international digital video compression standards issued by Moving Picture Experts Group (ISO/IEC 11172 and 13818).

FIGS. 6(a) and 6(b) illustrate a typical frame data structure according to the MPEG. As shown in FIGS. 6(a) and 6(b), a group of pictures (GOP), which is an encoding unit obtained by dividing one sequence of moving pictures, consists of 15 frames in total. More specifically, one GOP is made up of one intra-frame coded picture (I-picture), four inter-frame forward predictively coded pictures (P-pictures) and ten inter-frame bidirectionally predictively coded pictures (B-pictures).

As indicated by the arrows in FIG. 6(a), the I-picture I2 is intra-frame coded, i.e., coded within its own frame. P-pictures P5 and P8 are inter-frame forward predictively coded, i.e., coded by reference to the I-picture I2 and the P-picture P5, respectively. B-pictures B0 and B1 are inter-frame bidirectionally predictively coded, i.e., coded by reference to a P-picture P'14 belonging to the previous GOP and the I-picture I2. In the same way, B-pictures B3 and B4 are also inter-frame bidirectionally predictively coded, i.e., coded by reference to the I-picture I2 and the P-picture P5.

FIG. 6(b) illustrates the order in which the respective frames (or pictures) are actually encoded. In this order of encoding, if a frame is needed to decode another frame, then the former frame is decoded earlier than the latter frame. In general, to decode encoded data of a picture that has been compressed by the MPEG, three frame memories are required. Specifically, two frame memories are needed for reference frames and one frame memory is needed for a frame to be presented (i.e., for a B-picture).

Various standards are now being set up in the field of video compression. For example, the DVD-Video format, described in DVD Specifications for Read-only Disc Part 3, complies with the MPEG standards and therefore requires three frame memories to decode a picture. On the other hand, the DVD-Audio format, detailed in DVD Specifications for Read-only Disc Part 4, also requires the use of data compressed by the MPEG standards. However, since only I-pictures are compressed in the DVD-Audio format, two frame memories are usually needed.

FIGS. 7(a), 7(b) and 7(c) illustrate how storage sub-areas may be allocated for frame memories in the prior art. Specifically, FIG. 7(a) illustrates an exemplary allocation in the DVD-Video format, in which frame memories 0 and 1 are provided for reference pictures and frame memory 2 is provided for a B-picture. FIGS. 7(b) and 7(c) illustrate two exemplary allocations in the DVD-Audio format, in which frame memories 0 and 1 are both provided for I-pictures.

FIG. 8 is a timing diagram illustrating how pictures may be stored on frame memories during normal presentation and decoding operations according to the DVD-Video format. In FIG. 8 (and FIGS. 4 and 9), SYNC-stands for a vertical synchronizing signal. As shown in FIG. 8, each I- or P-picture decoded is stored on one of the frame memories 0 and 1 on which another picture has already been stored before the I- or P-picture. On the other hand, each B-picture decoded is always stored on the frame memory 2 for a frame to be presented.

FIG. 9 is a timing diagram illustrating how pictures may be stored on frame memories during normal presentation and decoding operations according to the DVD-Audio format. As shown in FIG. 9, each I-picture decoded is stored on one of the frame memories 0 and 1 on which another picture has already been stored before the I-picture. In the example illustrated in FIG. 9, each picture is supposed to be presented for three frame intervals.

To present pictures according to multiple video compression standards while using a single picture decoding system, the storage sub-areas should be allocated for respective frame memories efficiently. This is particularly true if a single system should perform decoding in the DVD-Video and DVD-Audio formats, because the DVD-Video requires three frame memories, while the DVD-Audio needs two.

Suppose the storage sub-areas are allocated for frame memories in the DVD-Video and DVD-Audio formats as shown in FIGS. 7(a) and 7(b), respectively. In that case, if the presentation method should be changed into that complying with the DVD-Audio while a picture stored on frame memory 2 is being presented according to the DVD-Video, then the video output should be suspended or the colors presented should be temporarily changed into border colors. This is because the storage sub-area allocated for the frame memory 2 in the DVD-Video is not reserved for frame memories in the DVD-Audio. Anyway, the presentation of decoded data discontinues when the presentation methods are changed.

If storage sub-areas are allocated for the frame memories as shown in FIG. 7(c) in presenting pictures according to the DVD-Audio, then the above problem can be solved. However, in that case, the remaining storage sub-area, which is not reserved for the frame memories, must be divided into two sub-areas 61 and 62 while pictures are presented by the DVD-Audio. That is to say, a continuous storage sub-area cannot be reserved, thus making it difficult to control the memories. Naturally, though, these problems are avoidable if a memory with a huge storage capacity is used. Nevertheless, the overall circuit size, cost or power dissipation should increase with such a memory.

SUMMARY OF THE INVENTION

It is therefore an object of the present invention to prevent a decoded picture from being presented discontinuously while the presentation methods are changed without using a memory with a huge storage capacity.

Another object of the present invention is to reserve a part of the storage area, other than the sub-areas allocated for frame memories, as a continuous area.

Specifically, an inventive decoding apparatus is adapted to present encoded data of a picture. The apparatus includes: means for decoding input encoded data of the picture; means for storing the decoded data, output from the decoding means, thereon so that the decoded data will be presented or used for decoding encoded data of another picture; means for allocating part of a storage area of the storage means for a frame memory on which the decoded data should be stored; and means for recognizing a presentation method for the decoded data and, if the presentation method has been changed into a new presentation method, for setting the number of frame memories as required by the new presentation method. If the presentation methods have been changed, the allocating means allocates the same number of sub-areas of the storage area as that set by the recognizing means for the frame memories such that the sub-area previously allocated for the frame memory, on which the decoded data being presented is stored, is included in the sub-areas newly allocated.

According to the present invention, if the presentation methods have been changed, the allocating means allocates the same number of sub-areas of the storage area as that set by the recognizing means for the frame memories such that the sub-area previously allocated for the frame memory, on which the decoded data being presented is stored, is included in the sub-areas newly allocated. Thus, even if the newly selected presentation method needs a different number of frame memories, the decoded data, which has been presented until just before the change, can be presented continuously and seamlessly.

In one embodiment of the present invention, before and after the presentation methods are changed, the decoded data is preferably presented continuously.

In another embodiment of the present invention, the presentation methods interchangeable may include at least a presentation method requiring three frame memories and a presentation method requiring two frame memories.

In still another embodiment, the allocating means preferably allocates two sub-areas, which are located at the beginning and at the end of a predetermined part of the storage area, respectively, for the frame memories such that a remaining sub-area of the predetermined part of the storage area, other than those allocated for the frame memories, is continuous. In such an embodiment, the remaining sub-area of the predetermined part of the storage area, other than those allocated for the frame memories, can be reserved as a continuous area. Accordingly, the storage means can be controlled more easily.

An inventive decoding method is adapted to present encoded data of a picture. The method includes the steps of: a) decoding input encoded data of the picture; b) storing the decoded data on storage means so that the decoded data will be presented or used for decoding encoded data of another picture; c) allocating part of a storage area of the storage means for a frame memory on which the decoded data should be stored; and d) recognizing a presentation method for the decoded data and, if the presentation method has been changed into a new presentation method, setting the number of frame memories as required by the new presentation method. If the presentation methods have been changed, the same number of sub-areas of the storage area as that set in the step d) are allocated in the step c) for the frame memories such that the sub-area previously allocated for the frame memory, on which the decoded data being presented is stored, is included in the sub-areas newly allocated.

According to the present invention, if the presentation methods have been changed, the same number of sub-areas of the storage area as that set in the step d) are allocated for the frame memories such that the sub-area previously allocated for the frame memory, on which the decoded data being presented is stored, is included in the sub-areas newly allocated. Thus, even if the newly selected presentation method needs a different number of frame memories, the decoded data, which has been presented until just before the change, can be presented continuously and seamlessly.

In one embodiment of the present invention, two sub-areas, which are located at the beginning and at the end of a predetermined part of the storage area, respectively, are allocated in the step c) for the frame memories such that a remaining sub-area of the predetermined part of the storage area, other than those allocated for the frame memories, is continuous. In such an embodiment, the remaining sub-area of the predetermined part of the storage area, other than those allocated for the frame memories, can be reserved as a continuous area. Accordingly, the storage means can be controlled more easily.

BRIEF DESCRIPTION OF THE DRAWINGS

FIG. 2(a) illustrates a format in which three frame memories are needed; and

FIGS. 2(b) and 2(c) illustrate a format in which two frame memories are needed.

DESCRIPTION OF THE PREFERRED EMBODIMENTS

Hereinafter, preferred embodiments of the present invention will be described with reference to the accompanying drawings.

Figure 1:
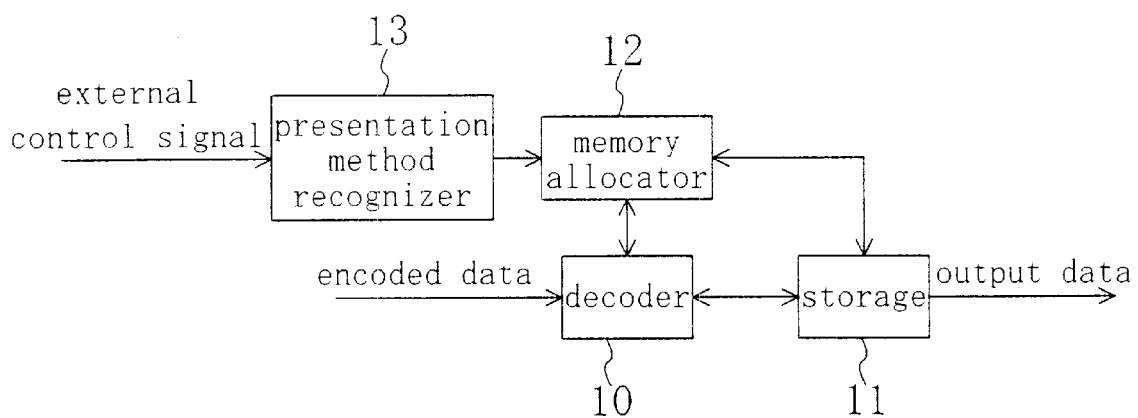
FIG. 1 is a block diagram illustrating an exemplary arrangement for a decoding apparatus according to an embodiment of the present invention.

FIG. 1 is a block diagram illustrating an exemplary arrangement for a decoding apparatus according to an embodiment of the present invention. As shown in FIG. 1, the apparatus includes decoder 10, storage 11, memory allocator 12 and presentation method recognizer 13. The decoder 10 decodes input encoded data of a picture. The storage 11 is a memory for storing the decoded data, output from the decoder 10, thereon so that the decoded data will be presented or used for decoding encoded data of another picture. The memory allocator 12 allocates part of a storage area of the storage 11 for a frame memory on which the decoded data should be stored.

The presentation method recognizer 13 recognizes a presentation method to be selected for the decoded data responsive an external control signal. If the presentation method has been changed into a new presentation method, the recognizer 13 sets the number of frame memories as required by the new presentation method. And if the presentation methods have been changed, the recognizer 13 informs the memory allocator 12 of the number of frame memories needed by the newly selected presentation method. Then, the allocator 12 allocates the same number of sub-areas of the storage area as that informed by the recognizer 13 for the frame memories such that the sub-area previously allocated for the frame memory, on which the decoded data being presented is stored, is included in the sub-areas newly allocated.

In the following description, the presentation methods interchangeable are supposed to include: a first presentation method, such as a method complying with DVD-Video, requiring three frame memories; and a second presentation method, such as a method complying with DVD-Audio, requiring two frame memories.

Figure 2C:
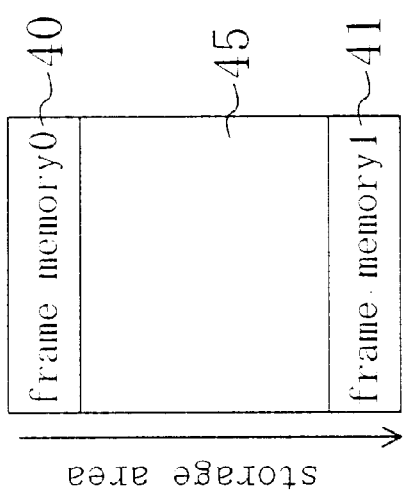
FIGS. 2(a), 2(b) and 2(c) illustrate exemplary allocations of storage sub-areas for frame memories according to the present invention.
Figure 2B:
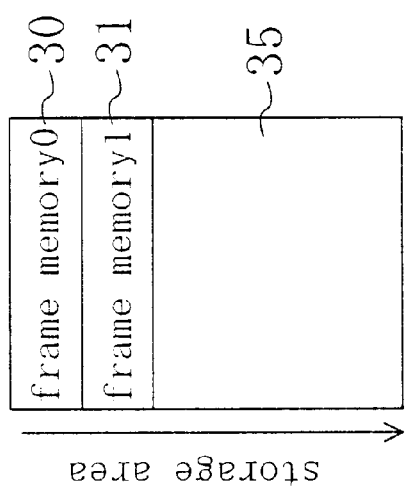
Figure 2A:
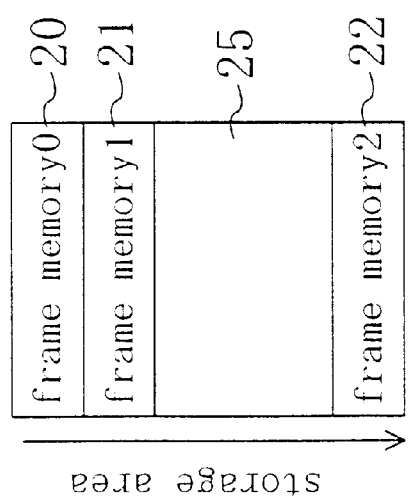

FIGS. 2(a), 2(b) and 2(c) illustrate exemplary allocations of storage sub-areas for frame memories according to the present invention. Specifically, FIG. 2(a) illustrates an exemplary allocation for the first presentation method requiring three frame memories, while FIGS. 2(b) and 2(c) illustrate two exemplary allocations for the second presentation method requiring two frame memories.

As shown in FIG. 2(a), as for the first presentation method, not all of the three frame memories 0, 1 and 2 are included in a series of sub-areas. Instead, a series of sub-areas 20 and 21 and the other sub-area 22, which are located at the beginning and at the end of the storage area of the storage 11, are separately allocated for the frame memories 0 and 1 and the frame memory 2, respectively. As for the second presentation method on the other hand, a series of sub-areas 30 and 31, located at the beginning of the storage area, may be allocated for the two frame memories 0 and 1 as shown in FIG. 2(b). Alternatively, one sub-area 40, located at the beginning of the storage area, may be allocated for one frame memory 0 and the other sub-area 41, located at the end of the storage area, may be allocated for the other frame memory 1 as shown in FIG. 2(c). By allocating the storage sub-areas in this manner, the remaining sub-area of the storage area, other than those allocated for the frame memories, can be reserved as a continuous area 25, 35 or 45.

Figure 3:
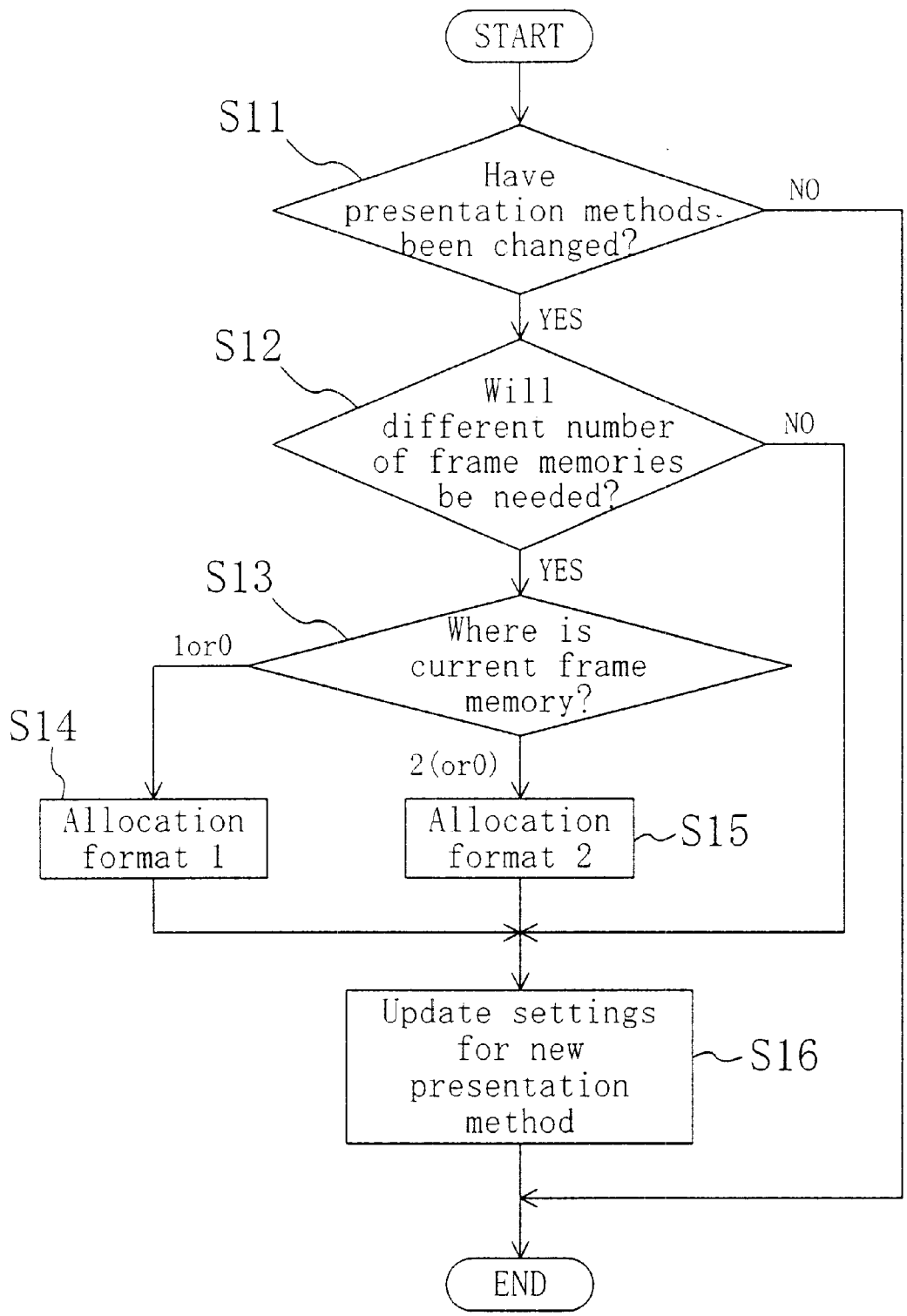
FIG. 3 is a flowchart illustrating an inventive procedure of adaptively allocating storage sub-areas for frame memories where presentation methods are changed.

FIG. 3 is a flowchart illustrating how the decoding apparatus shown in FIG. 1 adaptively allocates storage sub-areas for frame memories where presentation methods are changed. Suppose a picture is now being presented by the first presentation method with the storage sub-areas 20, 21 and 22 allocated for the frame memories as shown in FIG. 2(a). First, in Step S11, the presentation method recognizer 13 determines whether or not the presentation methods have been changed. If the answer is NO, then the process ends. Alternatively, if the answer is YES, the process advances to Step S12, in which the memory allocator 12 determines whether or not a different number of frame memories will be needed with the change of the presentation methods. If the number does change, then the allocator 12 determines whether or not the storage sub-areas should be re-allocated for the different number of frame memories. However, if the number of frame memories needed does not change, then the allocator 12 regards the re-allocation of storage sub-areas as unnecessary and the process jumps to Step S16, in which the decoding apparatus updates the settings for the new presentation method to end the process.

Suppose the first presentation method must be herein changed into the second presentation method. In that case, the number of frame memories needed changes from three into two. Thus, in Step S12, the memory allocator 12 regards the re-allocation of storage sub-areas as necessary and the process advances to Step S13. In Step S13, the allocator 12 locates the sub-area that has been allocated for the frame memory, on which the decoded data being presented is stored. If the sub-area 21 has been allocated for the frame memory on which the decoded data being presented is stored (i.e., if the decoded data is stored on the frame memory 1), then the allocator 12 selects the first allocation format shown in FIG. 2(b). As a result, the allocator 12 allocates the series of sub-areas 30 and 31, located at the beginning of the storage area, for the frame memories 0 and 1. On the other hand, if the sub-area 22 has been allocated for the frame memory on which the decoded data being presented is stored (i.e., if the decoded data is stored on the frame memory 2), then the allocator 12 selects the second allocation format shown in FIG. 2(c). As a result, the allocator 12 allocates the two sub-areas 40 and 41, located at the beginning and at the end of the storage area, for the frame memories 0 and 1, respectively. Furthermore, if the sub-area 20 has been allocated for the frame memory on which the decoded data being presented is stored (i.e., if the decoded data is stored on the frame memory 0), then the allocator 12 selects either the first or second allocation format. Thereafter, the process advances to Step S16, in which the decoding apparatus updates the settings for the new presentation method to end the process.

Figure 4:
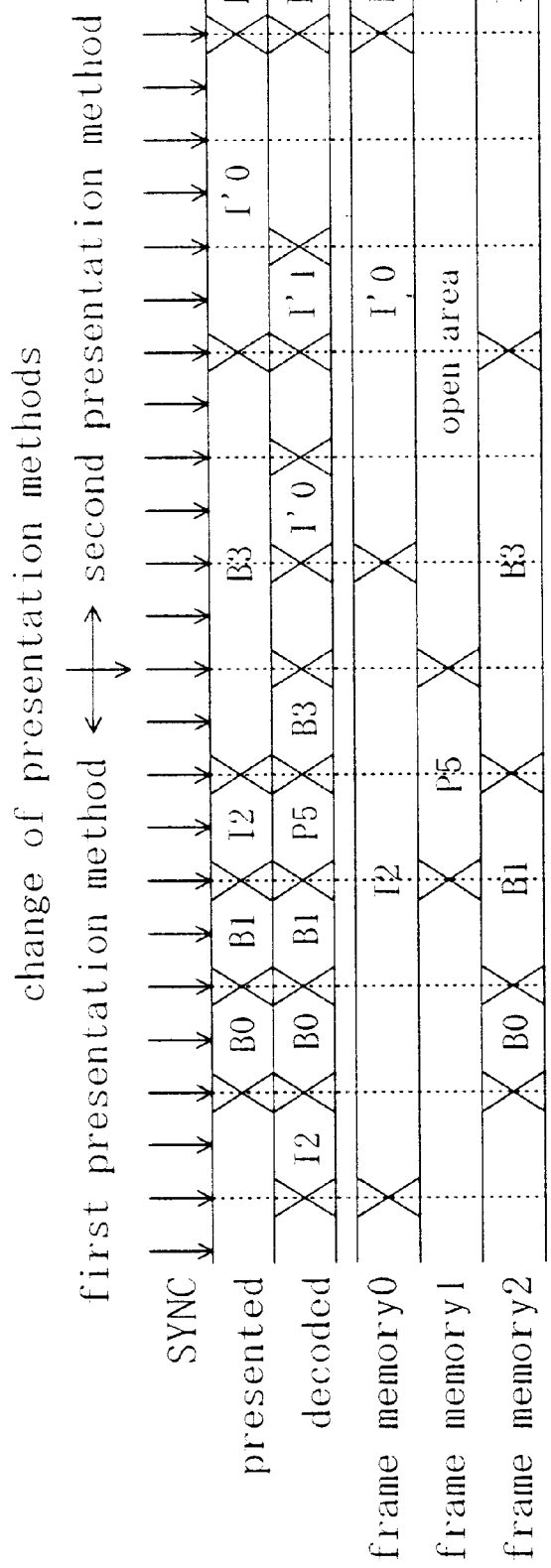
FIG. 4 is a timing diagram illustrating how pictures may be stored on respective frame memories according to the present invention where presentation methods are changed.

FIG. 4 is a timing diagram illustrating how the decoding apparatus shown in FIG. 1 stores pictures on respective frame memories where the first presentation method is changed into the second presentation method. In the example illustrated in FIG. 4, the presentation methods are changed while decoded data B3 is being presented and output by the first presentation method. In this case, the decoded data B3 being presented is stored on the frame memory 2 and therefore the storage sub-areas are re-allocated for the frame memories 0 and 1 according to the second presentation method as shown in FIG. 2(c). That is to say, the two sub-areas 40 and 41, located at the beginning and at the end of the storage area, are allocated for the frame memories 0 and 1, respectively. As a result, the sub-area 21, which has been previously allocated for the frame memory 1 by the first presentation method, is now de-allocated and the decoded data starts to be written on the frame memory 0 by the second presentation method newly selected.

That is to say, according to this embodiment, if the presentation methods have been changed, then the storage sub-areas are re-allocated for the frame memories such that the sub-area previously allocated for the frame memory, on which the decoded data being presented is stored, is included in the sub-areas newly allocated. Thus, the presentation methods can be changed while preventing the decoded data from being presented discontinuously.

In the foregoing embodiment, the entire storage area of the storage 11 is regarded as a "predetermined area" and the at least two sub-areas, located at the beginning and at the end of the predetermined area, are allocated for the frame memories as shown in FIGS. 2(a) and 2(c). Alternatively, the predetermined area to be allocated for the frame memories may be part of the storage area of the storage 11, other than at least one fixed area provided at the beginning and/or at the end of the storage area.

Figure 5C:
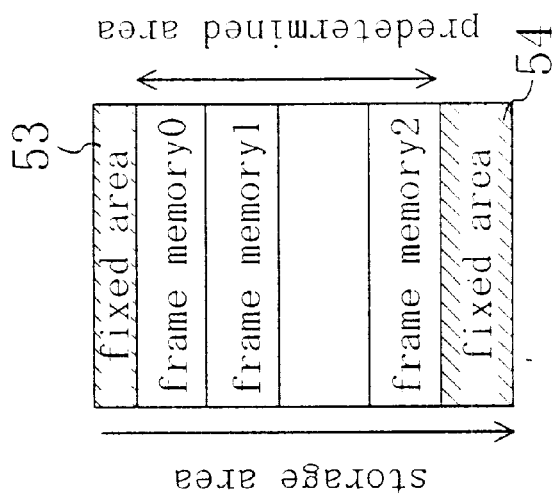
FIGS. 5(a), 5(b) and 5(c) illustrate how storage sub-areas may be allocated according to the present invention for frame memories where at least one fixed area is defined.
Figure 5B:
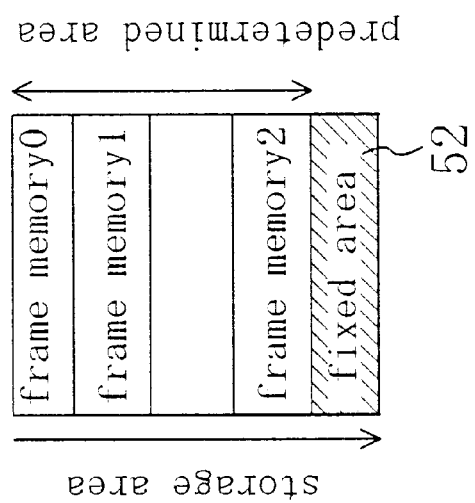
Figure 5A:
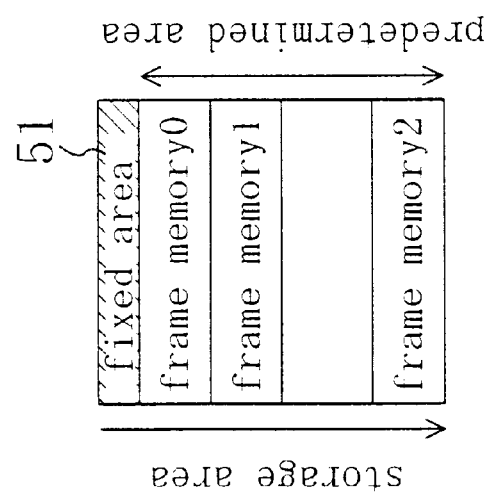
Figure 6A:
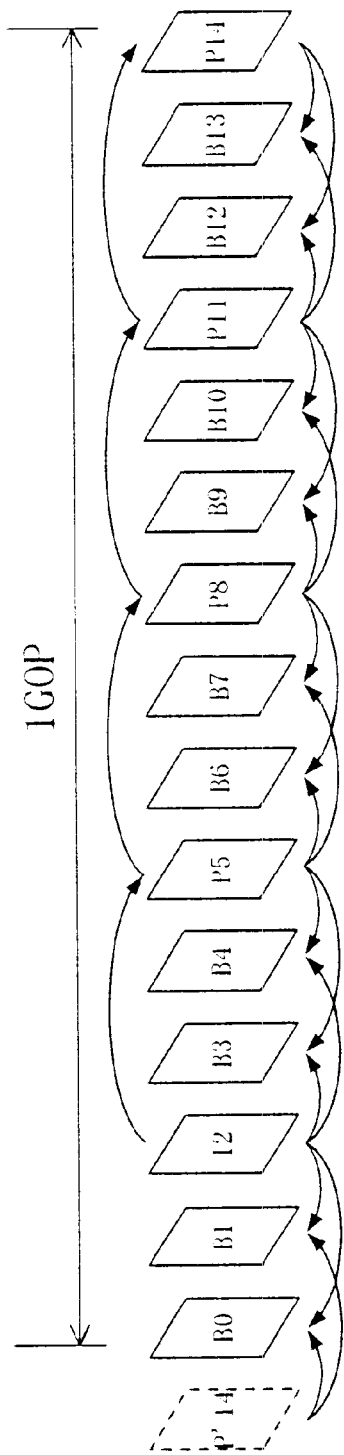
FIGS. 6(a) and 6(b) illustrate a typical frame data structure according to the MPEG standards.
Figure 6B:
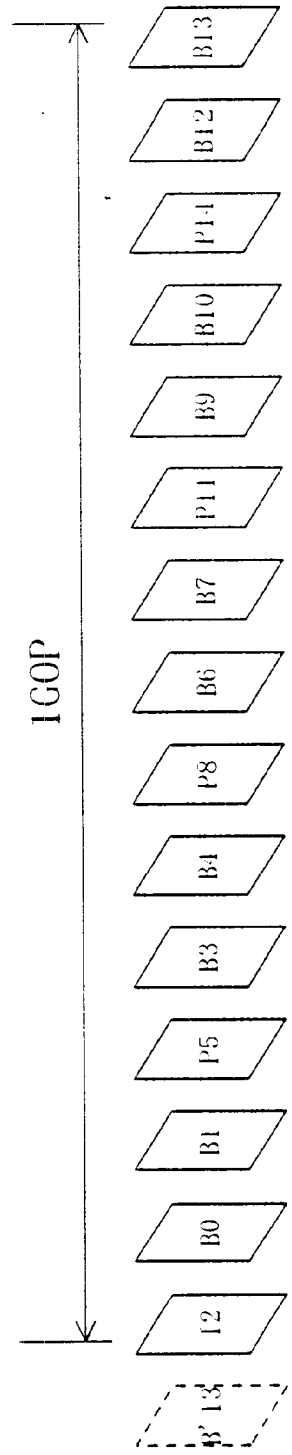
Figure 7C:
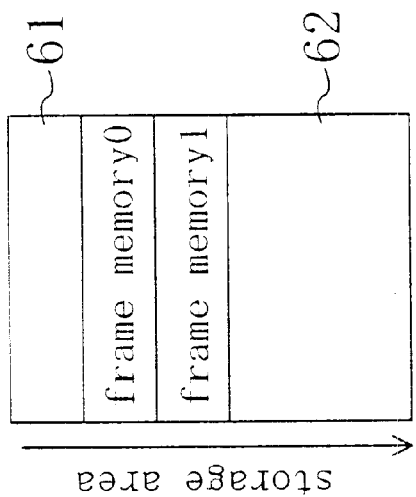
FIGS. 7(a), 7(b) and 7(c) illustrate how storage sub-areas may be allocated in the prior art for frame memories.
Figure 7B:
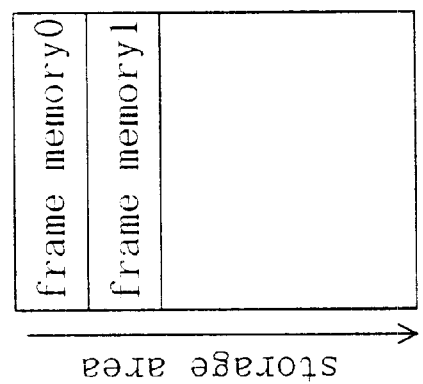
Figure 7A:
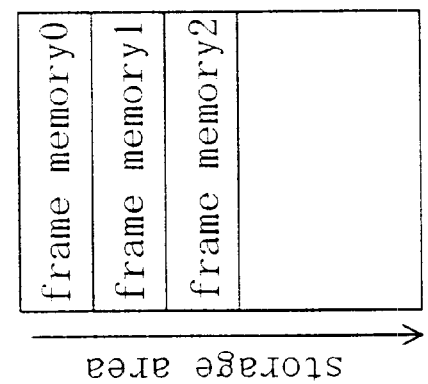
Figure 8:
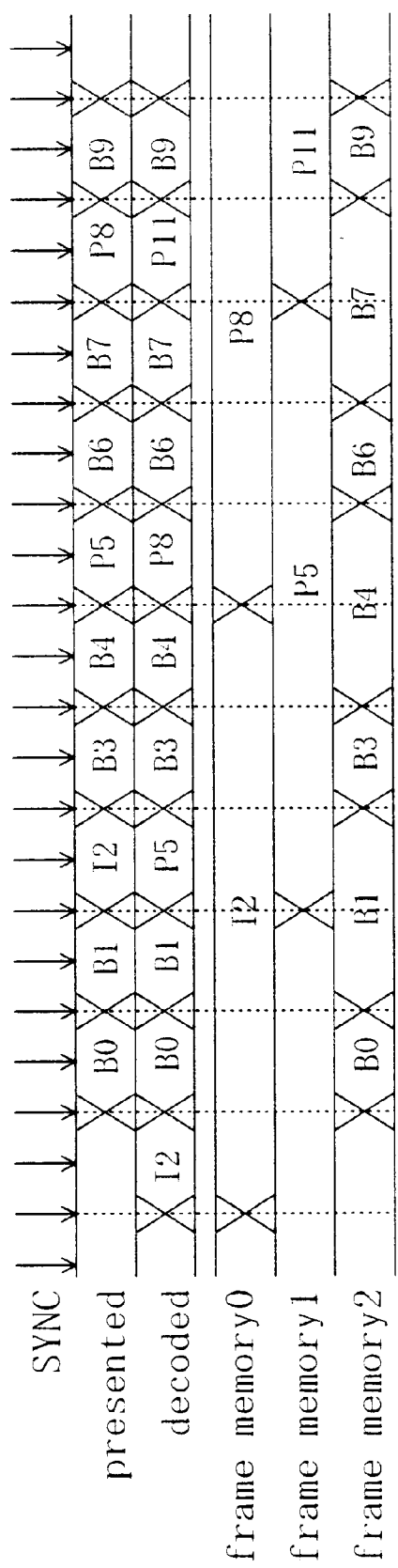
FIG. 8 is a timing diagram illustrating how pictures may be stored on frame memories in the prior art while the pictures are normally decoded and presented by a method requiring three frame memories.
Figure 9:
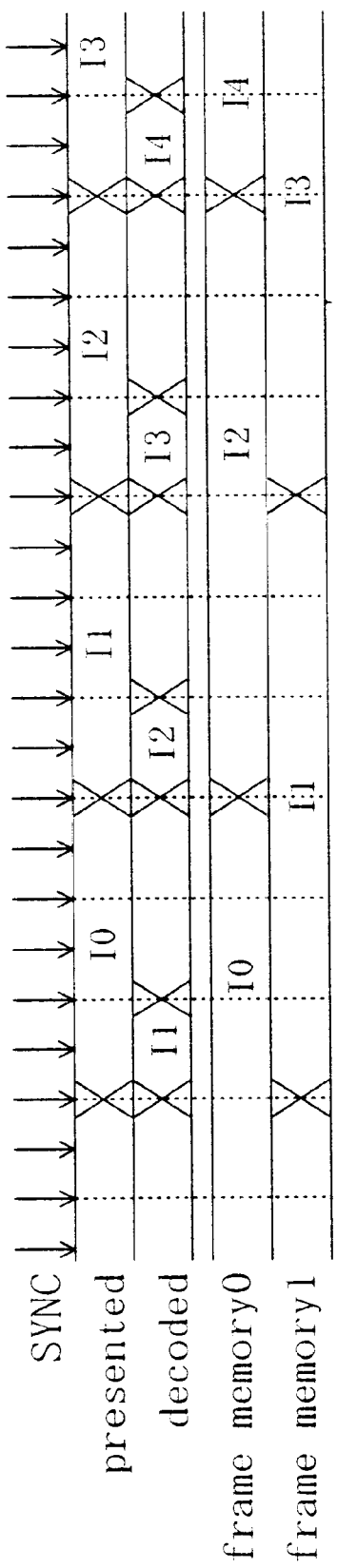
FIG. 9 is a timing diagram illustrating how pictures may be stored on frame memories in the prior art while the pictures are normally decoded and presented by a method requiring two frame memories.

FIGS. 5(a), 5(b) and 5(c) illustrate how storage sub-areas may be allocated for frame memories if at least one fixed area is defined. Specifically, FIG. 5(a) illustrates an allocation format in which a fixed area 51 is defined at the beginning of the storage area. FIG. 5(b) illustrates an allocation format in which a fixed area 52 is defined at the end of the storage area. And FIG. 5(c) illustrates an allocation format in which fixed areas 53 and 54 are defined at the beginning and at the end of the storage area, respectively.

In the foregoing embodiment, the three storage sub-areas are allocated for the three frame memories, required by the first presentation method, with two out of the three sub-areas defined at the beginning of the storage area as shown in FIG. 2(a). Alternatively, the three storage sub-areas may be allocated for the three frame memories with one of the three sub-areas defined at the beginning and the other two defined at the end of the storage area.

Also, in the foregoing embodiment, the two storage sub-areas are allocated for the two frame memories, required by the second presentation method, with the two sub-areas both defined at the beginning of the storage area as shown in FIG. 2(b). Alternatively, both of these two storage sub-areas may be allocated for the two frame memories at the end of the storage area.

Furthermore, in the foregoing embodiment, the presentation methods are supposed to be changed from a method requiring three frame memories into a method requiring two frame memories. However, the present invention is equally applicable to allocation of storage sub-areas for any other numbers of frame memories as required by the presentation methods.

As is apparent from the foregoing description, a presentation method can be changed according to the present invention into another method, requiring a different number of frame memories, without discontinuing the presentation of the current picture. In addition, the remaining part of the storage area, other than the sub-areas allocated for the frame memories, can be reserved as a continuous area and therefore the storage can be controlled more easily.

What is claimed is:

1. A decoding apparatus for presenting encoded data of a picture, the decoder comprising:

means for decoding input encoded data of the picture;

means for storing the decoded data, which has been output from the decoding means, thereon so that the decoded data will be presented or used for decoding encoded data of another picture;

means for allocating part of a storage area of the storage means for a frame memory on which the decoded data should be stored; and means for recognizing a presentation method for the decoded data and, if the presentation method has been changed into a new presentation method, for setting the number of frame memories as required by the new presentation method, wherein if the presentation methods have been changed, the allocating means allocates the same number of sub-areas of the storage area as that set by the recognizing means for the frame memories such that the sub-area previously allocated for the frame memory, on which the decoded data being presented is stored, is included in the sub-areas newly allocated.

2. The apparatus of claim 1, wherein before and after the presentation methods are changed, the decoded data is presented continuously.

3. The apparatus of claim 1, wherein the presentation methods interchangeable include at least a presentation method requiring three frame memories and a presentation method requiring two frame memories.

4. The apparatus of claim 1, wherein the allocating means allocates two sub-areas, which are located at the beginning and at the end of a predetermined part of the storage area, respectively, for the frame memories such that a remaining sub-area of the predetermined part of the storage area, other than those allocated for the frame memories, is continuous.

5. The apparatus of claim 4, wherein the predetermined part is a part of the storage area not including at least one fixed area that is provided at the beginning and/or at the end of the storage area.

6. The apparatus of claim 4, wherein the presentation methods interchangeable include at least a method complying with DVD-Video requiring three frame memories and a method complying with DVD-Audio requiring two frame memories, and wherein if the presentation method should comply with the DVD-Video, then the allocating means allocates one of the two sub-areas at the beginning and at the end of the predetermined part for two out of the three frame memories and the other sub-area for the remaining one frame memory, and wherein if the method complying with the DVD-Video is changed into the method complying with the DVD-Audio, then the allocating means selectively allocates a) one of the two sub-areas at the beginning and at the end of the predetermined part for the two frame memories or b) one of the two sub-areas for one of the two frame memories and the other sub-area for the remaining one frame memory, respectively, depending on where the sub-area allocated for the frame memory, on which the decoded data being presented is stored, is located.

7. The apparatus of claim 1, wherein the encoded data of the picture has been compressed by the MPEG standards.

8. A decoding method for presenting encoded data of a picture, the method comprising the steps of:

a) decoding input encoded data of the picture;

b) storing the decoded data on storage means so that the decoded data will be presented or used for decoding encoded data of another picture;

c) allocating part of a storage area of the storage means for a frame memory on which the decoded data should be stored; and d) recognizing a presentation method for the decoded data and, if the presentation method has been changed into a new presentation method, setting the number of frame memories as required by the new presentation method, wherein if the presentation methods have been changed, the same number of sub-areas of the storage area as that set in the step d) are allocated in the step c) for the frame memories such that the sub-area previously allocated for the frame memory, on which the decoded data being presented is stored, is included in the sub-areas newly allocated.

9. The decoding method of claim 8, wherein in the step c), two sub-areas, which are located at the beginning and at the end of a predetermined part of the storage area, respectively, are allocated for the frame memories such that a remaining sub-area of the predetermined part of the storage area, other than those allocated for the frame memories, is continuous.

* * * * *